(Model.)
H. THOMPSON.
Milk Can.
No. 235,044. Patented Nov. 30, 1880.
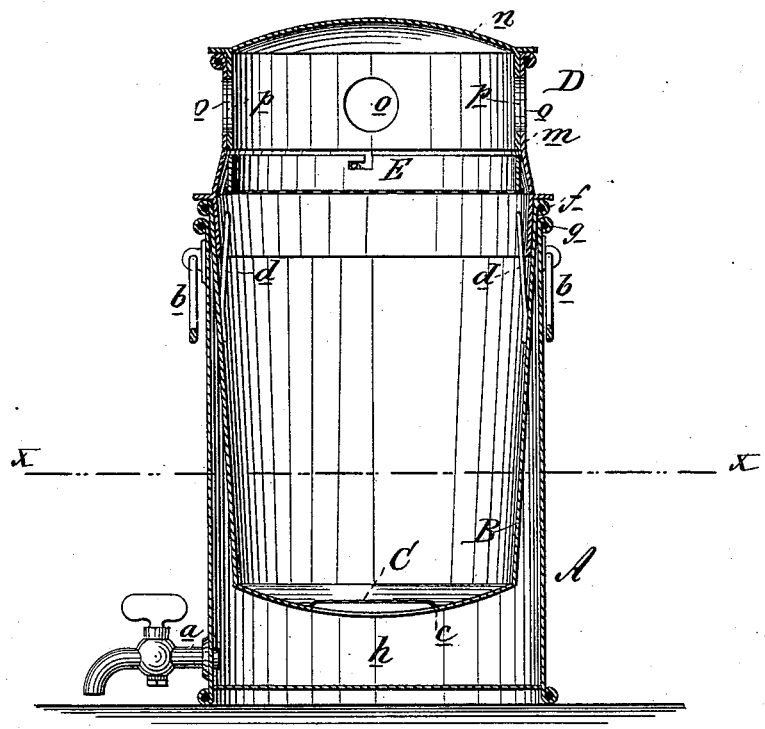
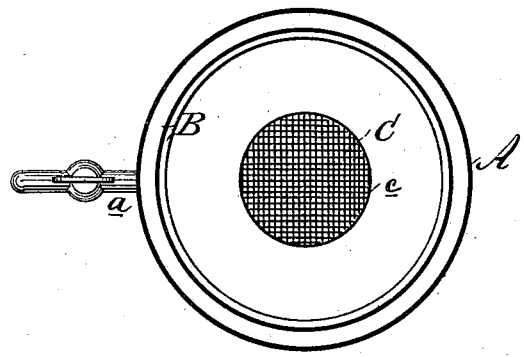
WITNESSES:
A. Schehl.
C. Sedgwick.
INVENTOR:
H. Thompson
BY Munn & Co.
ATTORNEYS.

UNITED STATES PATENT OFFICE.

HENRY THOMPSON, OF BROOKLYN, NEW YORK, ASSIGNOR OF ONE-FOURTH TO HENRY KERN, OF SAME PLACE.

MILK-CAN.

SPECIFICATION forming part of Letters Patent No. 235,044, dated November 30, 1880.

Application filed October 6, 1880. (Model.)

*To all whom it may concern:*

Be it known that I, HENRY THOMPSON, of Brooklyn, in the county of Kings and State of New York, have invented a new and Improved Milk-Can, of which the following is a specification.

The object of this invention is to provide a ventilated can in which milk or other liquid may be filtered and from which it may be drawn free from impurities.

Figure 1 is a sectional elevation of the device. Fig. 2 is a transverse section of the same on line X X, Fig. 1.

Similar letters of reference indicate corresponding parts.

In the drawings, A represents the outer vessel—which is preferably made of tin and of cylindrical form—provided with a faucet, *a*, near its bottom, and with dependent ears *b b* near its top.

B represents the inner vessel, of a somewhat conical shape, having an opening, *c*, in its bottom, in or over which is fitted a filter, C, and provided with rigid ears *d*, that project upward from the inside of said vessel B, and afford means whereby said vessel B may be removed from the inclosing-vessel A. Said vessel B is fixed within the vessel A so that its rim *f* rests on the rim *g* of the latter, in which a space, *h*, is left below this point of contact between the two vessels A B.

D represents the top of the can, consisting of the neck *m*, provided with openings *o* in its upper portion, and of a cap, *n*, which fits into the top of the neck *m*, and is provided with corresponding openings *p*. This top D is inserted within the top of the vessel B, so that when the parts A B D are together the device outwardly presents the appearance of an ordinary milk-can with holes around its top.

The cap *n* is inserted in the top of the neck *m* so that the openings *o p* shall come opposite each other, as shown in Fig. 1, and thus permit a circulation of air within said can, and an escape of warm air, gases, or odors from the contents thereof; or said cap *n* is inserted so that the openings *o p* do not come opposite each other, in which case all air and dust are excluded from the interior of the said can, and can and contents are ready for transportation.

E represents a filter that may be placed at any time within the neck *m*, and be secured there by any convenient device for preventing the ingress of dust, &c., to the contents of the can when the cap *n* is removed.

In using this can the milk or other liquid is introduced into the vessel B; thence it passes through the filter C into the vessel A, whence it is drawn off through the faucet *a*. In passing through the filter C the liquid should be freed from all suspended impurities and be delivered pure through the faucet *a*.

Having thus fully described my invention, I claim as new and desire to secure by Letters Patent—

The covered vessel B, tapering toward the lower end, adapted to be suspended in a vessel by the flange *f*, and provided with a top, D, having apertured neck *m*, filters E C, and a cap, *n*, with side holes corresponding with those in neck *m*, as shown and described.

HENRY THOMPSON.

Witnesses:
I. I. STORER,
C. SEDGWICK.